United States Patent [19]

Burgin

[11] Patent Number: 4,506,114
[45] Date of Patent: Mar. 19, 1985

[54] TELEPHONE CIRCUIT

[75] Inventor: Kenneth N. Burgin, Swindon, England

[73] Assignee: U.S. Philips Corporation, New York, N.Y.

[21] Appl. No.: 514,401

[22] Filed: Jul. 18, 1983

[30] Foreign Application Priority Data

Aug. 25, 1982 [GB] United Kingdom ............... 8224347

[51] Int. Cl.³ ..................... H04M 1/00; H04M 1/60; H04M 1/76
[52] U.S. Cl. ............................. 179/81 A; 179/16 F; 179/81 B
[58] Field of Search ............... 179/81 R, 2 BC, 81 B, 179/16 F, 16 AA, 16 A, 16 C, 18 FA, 170 NC, 170 T, 170 D, 70, 170 J, 77; 365/228, 229; 364/707; 307/66, 48, 51

[56] References Cited
U.S. PATENT DOCUMENTS 3,780,228 12/1973 Stewart ........................... 179/2 BC Primary Examiner—Gene Z. Rubinson
Assistant Examiner—James L. Dwyer
Attorney, Agent, or Firm—Thomas A. Briody; William J. Streeter

[57] ABSTRACT

A telephone speech and signalling circuit includes an integrated circuit powered by the exchange battery through the subscriber's line. The power supply for the integrated circuit is maintained during short duration line breaks caused by operations within the exchange by the charge on a capacitor which is charged from the exchange battery through the collector-emitter path of a first transistor when the subscriber's line is looped. The driving current for the first transistor is supplied by a second transistor. The integrated circuit compares the line voltage with the voltage across the capacitor, and reduces the driving current for the second transistor when the line voltage falls below the capacitor voltage. This reduces the driving current for the first transistor, reducing its conductivity to a level which prevents significant discharge of the capacitor but nevertheless allows line voltage to be discharged through the two transistors.

7 Claims, 3 Drawing Figures

TELEPHONE CIRCUIT

BACKGROUND OF THE INVENTION

1. Field of the Invention

The invention relates to a subscriber's telephone speech and signalling circuit including an integrated circuit powered by the exchange battery via the subscriber's line, the power supply for the integrated circuit being maintained during line breaks by the charge on a capacitor which is charged from the exchange battery via the collector-emitter path of a transistor when the subscriber's line is looped and means for preventing the discharge of the capacitor through the transistor when a line break is detected.

2. Description of the Related Art

In such circuits the means for preventing the discharge of the capacitor has previously comprised a diode in series with the capacitor between it and the transistor. However although the diode adequately prevents the discharge of the capacitor it has the disadvantage of reducing the voltage available to supply the integrated circuit by its forward voltage drop thus limiting the length of line over which the circuit will operate.

SUMMARY OF THE INVENTION

It is an object of the invention to provide such a subscriber's telephone circuit in which the means for preventing the discharge of the capacitor through the transistor does not cause any reduction of the supply voltage available to the integrated circuit during normal operation.

The invention provides a subscriber's telephone speech and signalling circuit in which during line breaks an appropriate signal is applied to the control electrode of the transistor to reduce the conductivity of the transistor to such a value that no significant current passes through it from the capacitor. Consequently, in contrast to interposing a diode to prevent the capacitor discharging through the transistor, the forward voltage drop across the diode is eliminated giving the circuit a capability of operating on longer lines. It is desirable to allow a small current to flow through the transistor to allow the line voltage to be discharged. Otherwise as soon as the voltage across the capacitor falls due to the current taken by the integrated circuit it will appear that the line break has ended and the transistor will again become conductive. Thus the line voltage will be discharged in short pulses and will only be discharged to the voltage across the capacitor. If the circuit is designed to time the length of the line breaks such a mode of operation would prevent accurate timing of the line breaks since false line breaks would be detected. An alternative approach would be to provide a separate discharge path for the line voltage operated for a short predetermined period when a line break is initially detected. This would however add to the cost of the circuit.

The means for preventing discharge of the capacitor during line breaks may comprise a comparator for comparing the voltage on the subscriber's line with that across the capacitor and producing an output signal which is coupled to the control electrode of the transistor to reduce the conductivity of the transistor when the voltage on the subscriber's line is less than that across the capacitor. The circuit may also include a second transistor which is connected to the control electrode of the first mentioned transistor.

The subscriber's speech and signalling circuit may include a sidetone cancellation arrangement which comprises a summing circuit, a microphone amplifier and an earpiece amplifier, means for feeding the output of the microphone amplifier to a first input of the summing circuit, means including the first and second transistors for phase inverting the output of the microphone amplifier and applying the phase inverted output to a second input of the summing circuit, and means for feeding the output of the summing circuit to the input of the ear piece amplifier. The second transistor may be provided with an emitter load which is selected to give a maximum side tone cancellation when the circuit is connected to a line having characteristics substantially midway between those of a minimum and a maximum length subscriber's line.

The subscriber's speech and signalling circuit may further include an automatic gain control circuit for controlling the gain of the microphone and earpiece amplifiers in accordance with the length of the subscriber's line to which it is connected, such an automatic gain control circuit comprising means for generating a reference voltage, means for comparing the reference voltage with the voltage across the capacitor and producing a control signal dependent on the difference between these voltages, and means for applying the control signal to to of the microphone and earpiece amplifiers to control the gains thereof. The reference voltage may be derived from the forward voltage drop across a semiconductor diode.

BRIEF DESCRIPTION OF THE DRAWINGS

An embodiment of the invention will now be described, by way of example, with reference to the accompanying drawings, in which.

DESCRIPTION OF THE PREFERRED EMBODIMENTS

Figure 1:
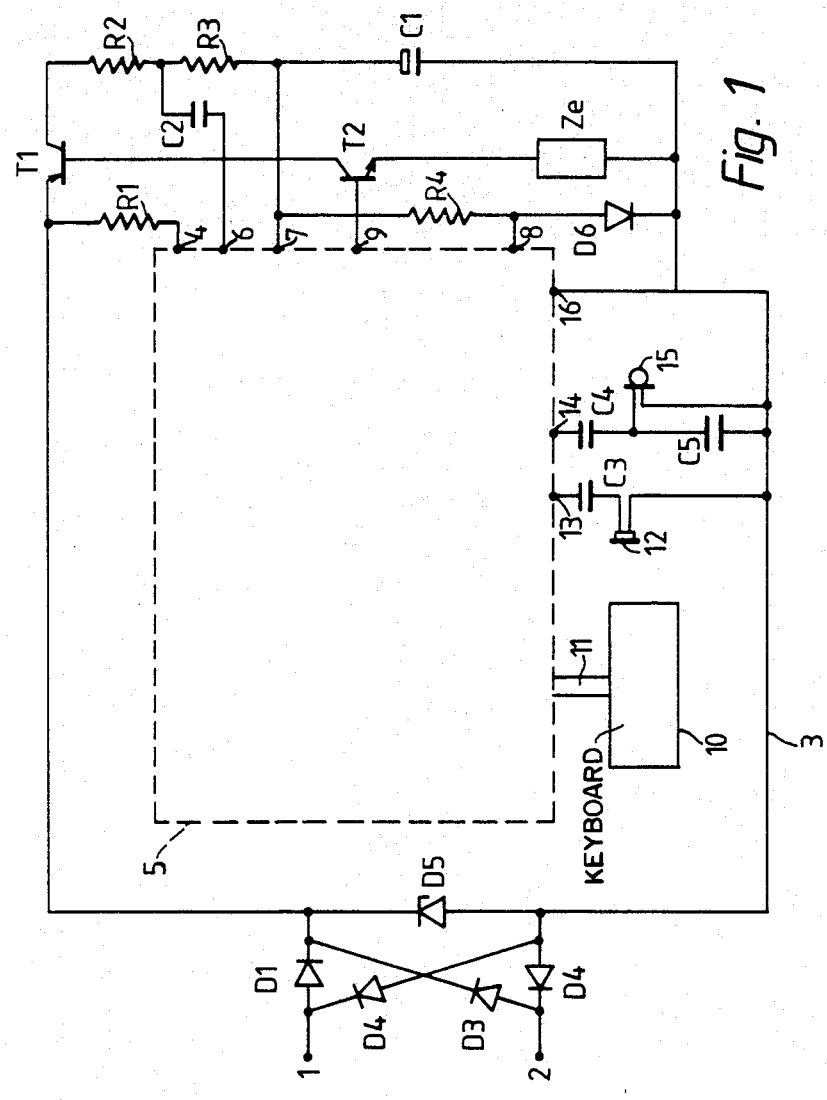
FIG. 1 shows a telephone speech and signalling circuit according to the invention.

The speech and signalling circuit for a telephone instrument shown in FIG. 1 is arranged to be connected to a subscriber's line via two terminals 1 and 2 and includes a bridge rectifier comprising four diodes D1 to D4 to enable the circuit to be connected to lines of either polarity. A zener diode D5 is connected across the line to protect the circuit against high transient voltages which may be induced in the subscriber's line. The terminal 1 is connected via the diode D1 to the junction of a resistor R1 and the emitter of a pnp transistor T1. The collector of transistor T1 is connected to one end of a resistor R2 which forms part of a series arrangement which also comprises a resistor R3 and a capacitor C1, the other end of the series arrangement being connected via a line 3 and the diode D2 to the terminal 2. The other end of the resistor R1 is connected to a terminal 4 of an integrated circuit 5 which together with the peripheral components shown in FIG. 1 forms a speech and signalling circuit for a telephone instrument. A terminal 6 of the integrated circuit 5 is connected to the junction of resistors R2 and R3 via a capacitor C2, while a terminal 7 is connected to the junction of the resistor R3 and the capacitor C1 and to one end of a resistor R4, the other end of which is connected via a diode D6 to the line 3 and to a terminal 8 of the integrated circuit 5. The base of transistor T1 is connected to the collector of an npn transistor T2 whose base is connected to a terminal 9 of the integrated circuit 5 and whose emitter is connected to one end of a load impedance Ze the other end of which is connected to the line 3.

A keyboard 10 is connected to the integrated circuit 5 via a highway 11 to enable a subscriber to key the number of the subscriber to whom he wishes to be connected. The series arrangement of an earpiece 12 and a capacitor C3 is connected between the line 3 and terminal 13 of the integrated circuit 5. The series arrangement of two capacitors C4 and C5 is connected between the line 3 and a terminal 14 of the integrated circuit 5, a microphone 15 being connected between the junction of the capacitors C4 and C5 and the line 3. The line 3 is also connected to a terminal 16 of the integrated circuit 5.

Figure 2:
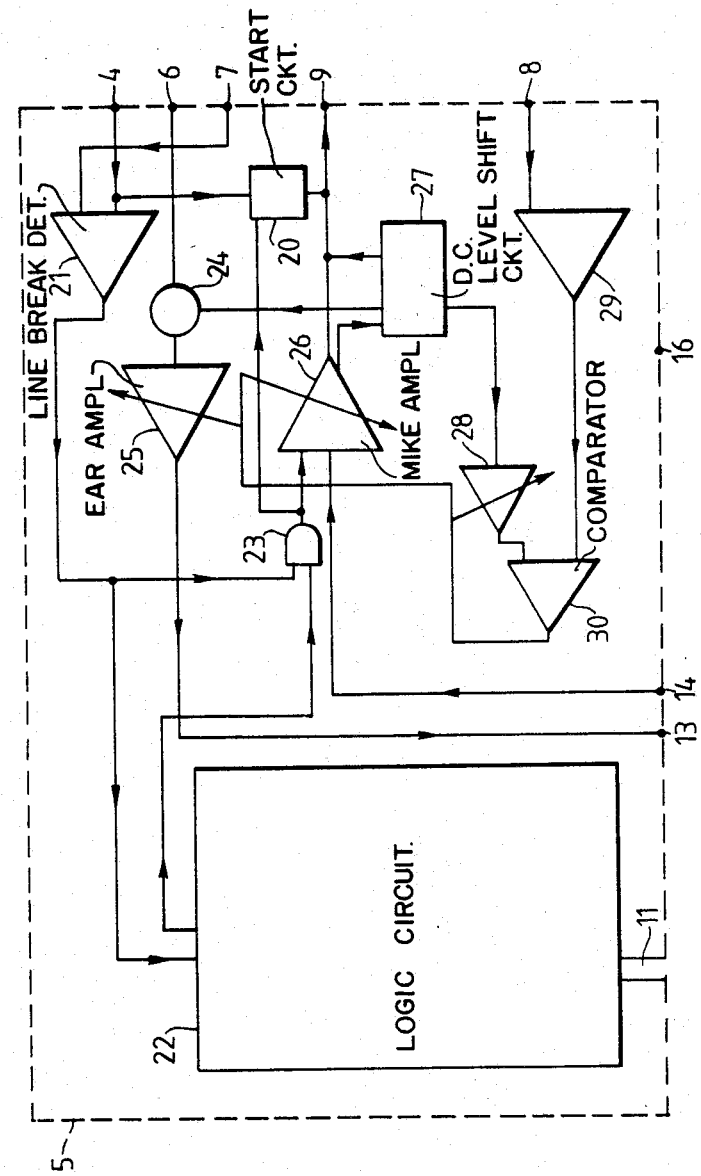
FIG. 2 is a block schematic diagram of the integrated circuit shown in FIG. 1.

FIG. 2 is a block schematic diagram of the integrated circuit 5. The terminal 4 is connected to a first input of a start up circuit 20 and to a first input of a line break detector 21. A second input of the line break detector 21 is connected to the terminal 7 while its output is connected to a first input of a logic circuit 22 and the first input of an OR gate 23. The terminal 6 is connected to a first input of a summing circuit 24 whose output is connected to the input of an earpiece amplifier 25, the output of which is connected to the terminal 13. The terminal 14 is connected to the input of a microphone amplifier 26 a first output of which is connected to the terminal 9 and a second output of which is connected to a second input of the summing circuit 24 via a d.c. level shift circuit 27. A further output of the d.c. level shift circuit 27 is connected to terminal 9 while a third output thereof is fed to the input of an amplifier 28. The terminal 8 is connected to the input of an amplifier 29. The outputs of the amplifiers 28 and 29 are fed to first and second inputs of a comparator 30 whose output is connected to the earpiece amplifier 25, the microphone amplifier 26, and the amplifier 28 to control their gains. An output of the logic circuit 22 is fed to the second input of the OR gate 23 while the highway 11 is connected to further inputs of the logic circuit 22.

The principle of operation of the speech and signalling circuit shown in the accompanying drawings is as follows.

Transistor T1 is simply a switch which is in the saturated state during speech and dial make periods, switching off only during impulses and line breaks. Transistor T2 provides amplification during speech and dial make periods but switches off during impulses and line breaks. Most of the line current flows down the base of transistor T1 and through transistor T2. The current supplying the integrated circuit flows through resistors R2 and R3 which together determine the telephone impedance since transistor T2 looks like a current source with a high impedance. Capacitor C1 smoothes the Vdd rail and keeps the circuit running during impulses and line breaks. Resistor R1 provides a small current which is used to start up the circuit by providing a small base current for transistor T2 and hence transistor T1. Resistor R4 and diode D6 provide a voltage reference and the diode D5 is a 150 volt Zener diode for protection against transient voltages induced in the subscriber's line.

The signal from the microphone 15 is amplified by the microphone amplifier 26 and is applied to the base of transistor T2. The output of the microphone amplifier also provides a feedback signal via transistors T1 and T2, resistors R2 and R3 and capacitor C2 and a sidetone cancellation signal via the d.c. level shift circuit 27.

The signal from the line is obtained via an attenuator comprising resistors R2 and R3 and is fed to the earpiece amplifier 25 after being summed with the sidetone signal from the microphone amplifier 26 in the summing circuit 24 to provide sidetone cancellation.

Both the microphone and earpiece amplifiers 26 and 25 have a line dependent gain which is controlled by an A.G.C. circuit. This circuit takes a voltage dependent on the voltage Vdd at terminal 7 which is the voltage on capacitor C1, and compares it with a voltage from the voltage reference circuit comprising the resistor R4 and the diode D6. By this means the amplifier gains are adjusted as a function of line current.

When the hook switch is operated the exchange battery is connected to the circuit via the terminals 1 and 2 and current starts to flow through the resistor R1 causing the start up circuit 20 to supply current via the terminal 9 to the base of transistor T2. This causes the transistor T1 to become conductive and hence connect the series arrangement of resistors R2 and R3 and capacitor C1 across the subscriber's line and thus capacitor C1 becomes charged. The power source for the circuit is the exchange battery via the subscriber's line and the capacitor C1 smooths this supply and the charge on the capacitor C1 which is connected between terminals 7 and 16 of the integrated circuit 5 provides the power source for the circuit 5 during line breaks caused by switching actions in the exchange and loop disconnect pulses generated by the logic circuit 22.

The logic circuit 22 detects key depressions on the keypad 10, stores them, and converts them into appropriate line disconnect pulses which are applied to the second input of the OR gate 23. Such circuits are well known in the art, an example being that described in UK Patent Specification No. 1195141. When a disconnect pulse is generated the current drive to the base of transistor T2 is reduced to cause transistor T2 to switch off which consequently causes transistor T1 to switch off, the supply for the integrated circuit 5 being maintained by the charge on the capacitor C1.

In the speech mode the signal from the microphone 15 is fed to the input of amplifier 26 and then to the line via the transistor T2 which further amplifies the speech signal.

The transistor T2 together with its emitter impedance Ze forms an amplifier having a gain approximately equal to $$\frac{(R2 + R3) Zo}{(R2 + R3 + Zo)Ze}$$

where Zo is the impedance of the subscriber's line. The amplifier formed by transistor T2 will also invert the phase of speech signal. The speech output fed to the line via the transistor T1 is also fed back via resistor R2 and capacitor C2 to the input 6 of the integrated circuit 5 and from there to the first input of the summing circuit 24. The output of the microphone amplifier 26 is fed via the d.c. level shift circuit 27 to the second input of the summing circuit 24. Since there is a 180° phase shift in the transistor T2 the signals at the inputs to the summing circuit are in antiphase and thus subtract from each other giving a reduced level input to the earpiece amplifier 25. The level of sidetone generated will depend on the line impedance and hence the line length and on the value of the impedance Ze in the emitter circuit of transistor T2. The impedance Ze is selected to give a minimum sidetone when the circuit is connected to a medium length line, the sidetone increasing on short or long lines. The impedance Ze may comprise, for example, a resistor in parallel with the series arrangement of a capacitor and a further resistor. Audio signals received via the subscriber's line pass through the transistor T1 and are fed via the resistor R2 and capacitor C2 to the terminal 6 of the integrated circuit 5 and then through the summing circuit 24 to the input of the earpiece amplifier 25. Since these signals do not pass through the microphone amplifier 26 there is no corresponding signal applied to the other input of the summing circuit 24 and hence no attenuation of the received signal before application to the earpiece amplifier 25. Since the signals of both the microphone and earpiece amplifiers pass through transistor T1 this transistor is common to both paths giving rise to the need for sidetone cancellation.

The gains of the microphone amplifier 26 and the earpiece amplifier 25 are automatically controlled to compensate for the length of the subscriber's line to which the circuit is connected. The automatic gain control circuit operates as follows. A constant reference voltage is generated by means of the current passed through the diode D6 via the resistor R4 and this reference voltage is applied to terminal 8 of the integrated circuit 5. The reference voltage is fed via a buffer amplifier 29 which may include a voltage multiplier to a first input of a comparator 30. A further voltage which is proportional to the supply voltage Vdd applied to terminal 7 of the integrated circuit 5 and consequently to the length of the subscriber's line is generated in the d.c. level shift circuit 27 and applied to the input of the amplifier 28. The comparator 30 produces an output dependent on the outputs of the amplifiers 28 and 29, the output of the comparator 30 being fed to a control input of the amplifier 28 to modify its gain such that the two inputs to the comparator tend towards equality. The gain control signal produced by the comparator 30 is also fed to a control inputs of the microphone and earpiece amplifiers 26 and 25 and consequently adjusts their gains in accordance with the length of the subscriber's line. Thus on long lines a higher level signal is fed from the microphone amplifier to the line and the earpiece amplifier has an increased gain to compensate for the lower level signal received.

During signalling the circuit may be subject to line breaks caused by the exchange and these should not interfere with the signalling. Consequently it is necessary that the circuit should be able to recognise these line breaks and to conserve the power stored on the capacitor C1 until the power from the exchange returns. To achieve this function the line break detector 21 compares the voltage on the line with that stored on the capacitor C1. The voltage on the line is detected by detecting the voltage on terminal 4, the voltage drop across resistor R1 being minimal after the start up circuit 20 has operated. When the voltage on the line falls below that on the capacitor C1 the line break detector 21 produces an output which is fed via the OR gate 23 to inhibit the microphone amplifier 26 and reduce the drive to transistor T2. Consequently the current through transistor T1 is reduced to a level which is sufficient to allow the line voltage to be discharged but not to allow any significant discharge of the capacitor C1. The current passed by transistor T2 is of the order of a few $\mu A$. If transistor TR1 is completely cut-off then the voltage across capacitor C1 will fall due to the current taken by the integrated circuit and thus cause the line break detector to assume that the line has been re-made and again switch on transistor TR1 for a short time until the line voltage, which will be discharged through transistors T1 and T2 again falls below that on capacitor C1. Thus the line voltage will be discharged only to the level of the voltage across capacitor C1. At the same time a signal is fed to the logic circuit 22 to start a timer which times the length of the line break and if the line break exceeds a preset limit the timer causes the circuit to be reset to speech mode on the assumption that the break is caused by a hook switch break action. If the line break duration is less than the preset limit impulsing is resumed on the return of power from the exchange. Thus it is desirable to steadily discharge the line voltage so that the line break detector only operates once at the beginning of each line break period.

Figure 3:
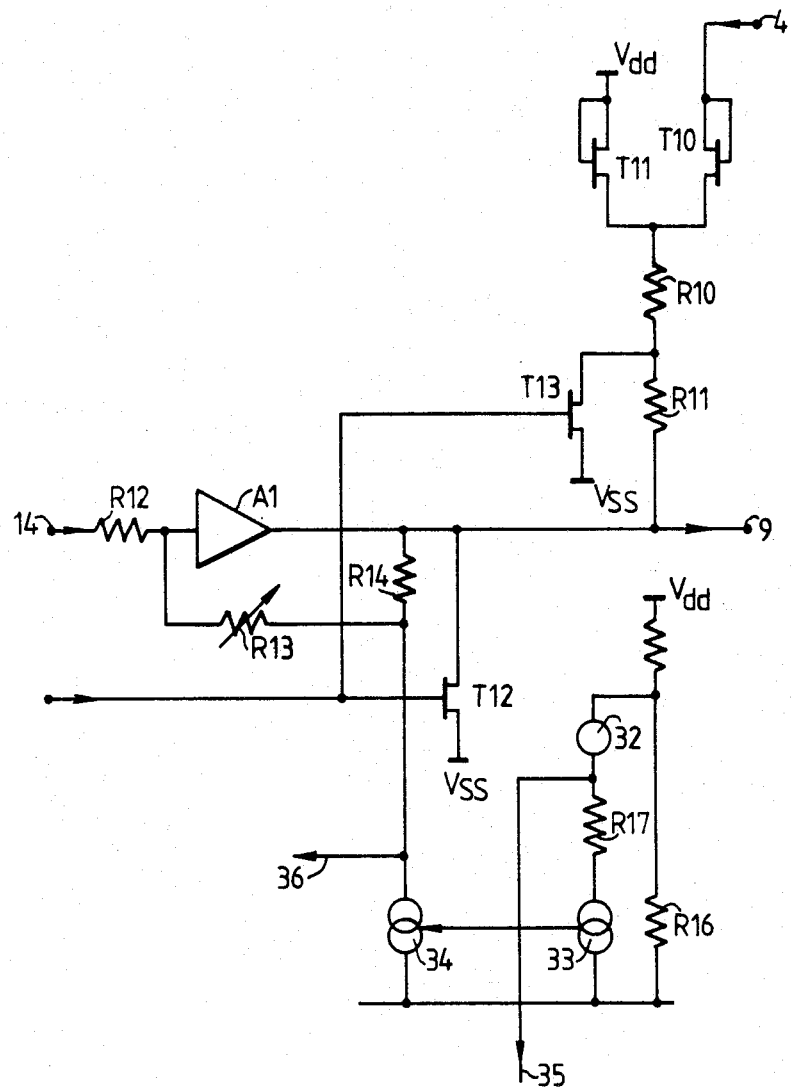
FIG. 3 is a circuit diagram of a portion of the integrated circuit shown in FIG. 2.

FIG. 3 shows an embodiment of the microphone amplifier 26, d.c. level shift circuit 27, and start up circuit 20 in greater detail. The terminal 4 of the integrated circuit 5 is connected to the gate and source electrodes of a field effect transistor (FET) T10 whose drain electrode is connected to one end of the series arrangement of two resistors R10 and R11, the other end of the series arrangement being connected to terminal 9 of the integrated circuit 5. A second FET T11 has its gate and source electrodes connected to the positive supply rail Vdd (terminal 7) and its drain electrode connected to the junction of resistor R10 and the drain electrode of FET T10. The field effect transistors T10 and T11 are constructed so that the gain of FET T11 is very much greater than that of the FET T10. Thus the start up circuit 20 operates as follows. When the hook switch is made current flows from the exchange battery along the subscriber's line and through resistor R1, terminal 4, FET T10, resistors R10 and R11, and terminal 9 to the base of transistor T2. This current turns on transistor T2 which provides a base current to transistor T1 thus enabling current to flow through transistor T1 and resistors R2 and R3 to terminal 7 and to charge the capacitor C1. As the voltage on terminal 7 increases current flows through FET T11 and resistors R10 and R11 to the base of transistor T1 to maintain it in a conductive state. Since the gain of FET T11 is very much greater than that of FET T10 very little current flows through FET T10 and consequently through resistor R1. Thus once the start up circuit 20 has performed its initial function the current through resistor R1 is reduced to such a small value that the voltage drop across it is negligible. Thus the voltage on terminal 4 of the integrated circuit 5 can be used by the line break detector 21 to monitor the line voltage.

The microphone amplifier 26 comprises an amplifier A1 whose input is connected to terminal 14 of the integrated circuit 5 via a resistor R12, the series arrangement of two further resistors R13 and R14 being connected between the input and output of the amplifier A1. Resistor R13 is variable and determines the gain of the microphone amplifier 26. In practice the resistor R13 is in the form of a transistor whose conductivity is controlled by the output signal from the comparator 30. A second input 31 of the amplifier 26 is connected to the gate of an FET T12 whose source is connected to terminal 9 of the integrated circuit 5 and whose drain is connected to the negative supply potential Vss (terminal 16). The input 31 of the amplifier 26 is connected to the output of the OR gate 26 which is also connected to the gate electrode of an FET T13 in the start up circuit 20. The source electrode of FET T13 is connected to the junction of resistors R10 and R11 while its drain electrode is connected to the negative supply potential Vss.

The d.c. level shift circuit 27 includes a potential divider circuit connected between the positive and negative supply potentials Vdd and Vss, the potential divider comprising two resistors R15 and R16. The series arrangement of a voltage source 32, a resistor R17 and a current source 33 is connected between the junction of resistors R15 and R16 and the negative supply potential Vss. A further current source 34 is connected between the negative supply potential Vss and the junction of resistors R13 and R14 in the microphone amplifier 26. The current sources 33 and 34 are coupled together to provide equal currents and may be formed as a current mirror circuit. The junction of the voltage source 32 and the resistor R17 is connected to a line 35 which is coupled to the input of the amplifier 28. Since the positive supply voltage Vdd is dependent on the length of the line the voltage on line 35 will also be dependent on the length of the line and is used as a measure of the line length to set the gains of the microphone and earpiece amplifiers 26 and 25 by means of an automatic gain control circuit which comprises the voltage reference source formed by the resistor R4 and diode D6, amplifiers 28 and 29 and comparator 30. The junction of resistor R14 and the current source 34 is connected via a line 36 to the second input of the summing circuit 24. The d.c. level shift on the output of the amplifier 26 attached to pin 9 is not reflected on the line 36 so that no d.c. level shift occurs at the input of the summing circuit 24 as a result of differing line lengths. The d.c. potential on terminal 9 will vary with line current and hence line length as a result of the voltage drop across the emitter impedance Ze of transistor T2.

When a line break is detected the signal from the output of the OR gate 23 causes the FET T12 to become more conductive and thus pull the potential on terminal 9 towards the negative supply potential Vss. At the same time current is prevented from flowing through the start up circuit 20 by turning on FET T13 and consequently connecting the junction of resistors R10 and R11 to the negative supply potential Vss. Thus the current flowing through transistor T2 and hence transistor T1 is reduced which in turn reduces the rate of discharge of the capacitor C1 through these two transistors during line breaks. It should be noted that the output of the line break detector 21 is an analogue voltage and that the signal on the gate of FET T12 does not switch this device hard 'on'. Consequently some current is still allowed to flow to the base of transistor T2 to allow the line voltage to be discharged but this current is reduced to a very low value, of the order of a few micro amperes, so that no significant discharge of capacitor C1 through transistors T1 and T2 occurs.

It would, alternatively, be possible to arrange for transistor T1 to be switched hard off when a line break is detected and to provide an alternative discharge path for the line voltage. For example a transistor switch could be connected across the line the switch being operated for a short predetermined period at the start of any line break. This could be achieved by driving the transistor from a monostable circuit triggered by the output of the line break detector.

I claim:

1. A subscriber's telephone speech and line signalling circuit comprising an integrated circuit powered by the exchange battery through the subscriber's line, the integrated circuit being connected to the subscriber's line through the collector-emitter path of a transistor, the power supply for the integrated circuit being maintained during line breaks by the charge on a capacitor which is charged from the exchange battery through the collector-emitter path of the transistor when the subscriber's line is looped, and means for preventing the discharge of the capacitor through said transistor when a line break is detected, said means being adapted to reduce the conductivity of said transistor to such a value that no significant current passes through it from said capacitor for the duration of the line break by applying an appropriate signal to the control electrode of the transistor.

2. A circuit according to claim 1, in which said means for preventing discharge of the capacitor comprises a comparator for comparing the voltage on the subscriber's line with that across said capacitor and producing an output signal which is coupled to the control electrode of said transistor to reduce the conductivity of said transistor when the voltage on the subscriber's line is less than that across said capacitor.

3. A circuit according to claim 1, further comprising a second transistor the collector-emitter path of which is connected to the control electrode of the first-mentioned transistor.

4. A circuit according to claim 3, further comprising a sidetone cancellation arrangement which comprises: a summing circuit, a microphone amplifier and an earpiece amplifier; means for feeding the output of the microphone amplifier to a first input of the summing circuit, means including said first and second transistors for phase inverting the output of the microphone amplifier and applying such phase inverted output to a second input of said summing circuit; and means for feeding the output of the summing circuit to the input of the earpiece amplifier.

5. A circuit according to claim 4, in which said second transistor is provided with an emitter load which is selected to give a maximum side tone cancellation when the circuit is connected to a subscriber's line having characteristics substantially mid-way between those of a minimum and a maximum length subscriber's line.

6. A circuit according to claim 4, further comprising and including an automatic gain control circuit for controlling the gain of the microphone and earpiece amplifiers in accordance with the length of the subscriber's line, such automatic gain control circuit comprising: means for generating a reference voltage, means for comparing the reference voltage with the voltage across said capacitor and producing a control signal dependent on the difference between these voltages, and means for applying the control signal to the microphone and earpiece amplifiers to control the gains thereof.

7. A circuit according to claim 6, in which the reference voltage is derived from the forward voltage drop across a semiconductor diode.

* * * * *